(12) United States Patent
Matsumoto et al.

(10) Patent No.: US 7,245,289 B2
(45) Date of Patent: Jul. 17, 2007

(54) FORCE-APPLYING INPUT DEVICE

(75) Inventors: Ken Matsumoto, Iwate-ken (JP);
Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 555 days.

(21) Appl. No.: 10/780,986

(22) Filed: Feb. 18, 2004

(65) Prior Publication Data
US 2004/0167642 A1 Aug. 26, 2004

(30) Foreign Application Priority Data
Feb. 24, 2003 (JP) ............................. 2003-046286

(51) Int. Cl.
*G09G 5/08* (2006.01)

(52) U.S. Cl. ...................... 345/161; 345/162; 345/164; 345/166; 345/159

(58) Field of Classification Search ........ 345/156–158, 345/161–168, 649, 506, 419, 650, 184, 619, 345/622, 421, 423; 364/190; 700/83–85, 700/45; 180/421; 307/10.1, 9.1; 455/566; 715/856
See application file for complete search history.

(56) References Cited

U.S. PATENT DOCUMENTS

| | | | |
|---|---|---|---|
| 4,294,162 A * | 10/1981 | Fowler et al. ................ | 91/434 |
| 4,580,210 A * | 4/1986 | Nordstrom .................... | 700/85 |
| 5,125,602 A | 6/1992 | Vauvelle et al. | |
| 5,907,487 A * | 5/1999 | Rosenberg et al. ........... | 700/85 |
| 6,005,551 A * | 12/1999 | Osborne et al. ............. | 345/161 |
| 6,050,718 A * | 4/2000 | Schena et al. ................ | 700/85 |
| 6,147,674 A | 11/2000 | Rosenberg et al. | |
| 6,252,579 B1 * | 6/2001 | Rosenberg et al. .......... | 715/856 |
| 6,505,088 B1 * | 1/2003 | Simkin et al. ................ | 700/85 |
| 6,593,667 B1 * | 7/2003 | Onodera et al. ........... | 307/10.1 |
| 6,891,526 B2 * | 5/2005 | Gombert et al. ............ | 345/156 |
| 6,924,787 B2 * | 8/2005 | Kramer et al. .............. | 345/156 |
| 7,024,228 B2 * | 4/2006 | Komsi et al. ............... | 455/566 |
| 7,075,527 B2 * | 7/2006 | Takagi et al. ............... | 345/184 |
| 7,154,472 B2 * | 12/2006 | Matsumoto et al. ........ | 345/156 |
| 2002/0108802 A1 * | 8/2002 | Draper ......................... | 180/421 |
| 2003/0018403 A1 * | 1/2003 | Braun et al. .................. | 700/45 |
| 2005/0195167 A1 * | 9/2005 | Matsumoto et al. ........ | 345/161 |
| 2005/0259075 A1 * | 11/2005 | Ishikawa et al. ............ | 345/161 |
| 2005/0259076 A1 * | 11/2005 | Hayasaka et al. ........... | 345/161 |

OTHER PUBLICATIONS

Search Report dated Mar. 24, 2006 for corresponding European Patent Application No. 04 003 500.8.

* cited by examiner

*Primary Examiner*—Bipin Shalwala
*Assistant Examiner*—Prabodh Dharia
(74) *Attorney, Agent, or Firm*—Brinks Hofer Gilson & Lione (57) ABSTRACT

A force-applying input device includes a mechanical section including a tilting lever; an operation section mounted to an end of the tilting lever; first and second actuators which apply a force to the operation section through the tilting lever; first and second position sensors which detect operation amount and direction of the tilting lever; and a control section which generates first and second drive signals of the first and second actuators by receiving first and second position signals output from the respective first and second position sensors. Based on the first and second position signals output from the position sensors, the control section computes the first and second drive signals of the first and second actuators in accordance with operation amount and direction of the operation section, and outputs first and second drive powers of the respective first and second actuators from first and second drive circuits.

11 Claims, 5 Drawing Sheets

FORCE-APPLYING INPUT DEVICE

This application claims the benefit of priority to Japanese Patent Application No. 2003-046286, herein incorporated by reference.

BACKGROUND OF THE INVENTION

1. Field of the Invention

The present invention relates to a force-applying input device for applying a force which is electrically controlled by a manually operated operation section. More particularly, the present invention relates to means for applying a force which is similar to frictional force of a mechanism to an operation section of a joystick input device.

2. Description of the Related Art

In recent years, a force-applying biwire input device (hereinafter referred to as a "force-applying input device" in the specification) has been proposed in place of a mechanical input device for transmitting an operation state of an operation section to a control section through a mechanism. The force-applying input device applies a predetermined force to an operation section by converting an operation state of the operation section into an electrical signal, by transmitting the electrical signal to a control section, and by controlling drive of an actuator, such as an electric motor, and increeases its range of application. Various types of force-applying input devices are available. They include a sliding force-applying input device, a lever force-applying input device, a rotary force-applying input device, and a joystick force-applying input device. The sliding and the lever force-applying input devices allow reciprocatory operation of the operation section in only one direction. The rotary force-applying input device allows reciprocatory rotational operation of the operation section only around one axis. The joystick force-applying input device allows operation of the operation section in any direction.

In the force-applying input device, various forces can be applied to the operation section by controlling the driving of the actuator, thereby making it possible for an operator to feel a force in accordance with the operation state of the operation section. However, a force-applying input device which can apply with good repeatability a force which is similar to frictional force of a mechanism felt by the operator when the operator operates the operation section of a mechanical input device has not yet been proposed.

Applying a force which is similar to frictional force of a mechanism to the operation section in the force-applying input device is particularly important in reducing differences in operational feel experienced by the operator when changing from a mechanical input device to the force-applying input device in order to prevent, for example, improper operation of or a delay in operation of the operation section due to inexperience of the operator. Therefore, high expectations are placed on the production of such a force-applying input device.

The present inventors have not been able to find any related-art documents disclosing a description related to the present invention up to the present time.

In order to apply a force which is similar to frictional force of a mechanism felt by an operator who operates an operation section of a mechanical input device to the operation section of the force-applying input device, the sliding force-applying input device, the lever force-applying input device, and the rotary force-applying input device must satisfy the following three Conditions (1) to (3):

(1) when the operation section is operated in one direction from a start position, driving force of the actuator, that is, an external force with respect to the operation section, must act in a direction opposite to the operation direction of the operation section, (2) from a time in which the operation is started to a time in which the operation is stopped, the magnitude of the external force acting upon the operation section must be substantially constant, and (3) after stopping the operation, the operation section must be stably held.

The joystick force-applying input device must satisfy the aforementioned three Conditions (1) to (3), and Condition (4) in which the aforementioned three Conditions (1) to (3) must be satisfied when the operation direction of the operation section is changed during the operation of the operation section.

Conditions (1) and (2) are relatively easily satisfied by the sliding force-applying input device, the lever force-applying input device, the rotary force-applying input device, and the joystick force-applying input device by detecting the direction and amount of operation of the operation section by a position sensor, and by controlling the driving of the actuator by a control section based on a position signal output from the position sensor so that a predetermined force corresponding to frictional force is applied in the direction opposite to the operation direction of the operation section.

However, when such structures are used, application of a predetermined external force which is similar to the frictional force to the operation section is continued even after the operator stops operating the operation section. Therefore, each time the operator takes his/her hand off the operation section, the following is repeated: the operation section returns in the direction opposite to the operation direction prior to stopping the operation by the external force, the position sensor detects the direction and amount of this returning movement, and the actuator applies the predetermined external force, which is similar to the frictional force, in a direction opposite to the returning direction. Consequently, Condition (3) cannot be satisfied.

In addition to the aforementioned disadvantages, the joystick force-applying input device has the disadvantage that, when the operation direction of the operation section is changed during the operation of the operation section, a constant external force can no longer be applied in the direction opposite to the operation direction of the operation section. Therefore, the joystick force-applying input device cannot satisfy Conditions (1) to (3).

That is, in the case in which the direction and amount of operation of the operation section is detected by the position sensor, the control section controls the driving of the actuator based on the position signal output from the position sensor so that the predetermined external force corresponding to the frictional force is applied in a direction opposite to the direction of the operation section. When the operation section is operated in an X axis direction, and then is operated in a Y axis direction from a position reached by the operation in the X axis direction, Conditions (1) and (2) cannot be satisfied. This is because, a resultant external force component corresponding to the amount of operation in the X axis direction and to the amount of operation in the Y axis direction is applied to the operation section with a magnitude of $(\sqrt{2}) \cdot F_{max}$ (when the magnitudes of the external force components in the respective directions are $F_{max}$), and at an angle of 45 degrees with respect to the X and Y axis directions based on the position signal output from the position sensor. In addition, when the operator takes his/her hand off the operation section, the operation section returns at an angle of 45 degrees with respect to the X and Y axis directions due to: the resultant force that acts upon the operation section, detection of the direction and amount of this returning movement by the position sensor, and application of a predetermined external force which is similar to the frictional force by the actuator in a direction opposite to the returning direction. These actions are repeated. Therefore, Condition (3) cannot be satisfied.

SUMMARY OF THE INVENTION

Accordingly, embodiments of the present invention provide a force-applying input device which can apply a force which is similar to frictional force to a joystick operation section, and which provides a proper operational feel.

To this end, according to the present invention, there is provided a force-applying input device comprising a joystick operation section, a position sensor for detecting an operation state of the operation section, an actuator for applying an external force to the operation section, and a control section for controlling drive of the actuator based on a position signal output from the position sensor. The control section computes operation amounts and operation directions of the operation section based on the position signal, and controlling the drive of the actuator, wherein, when the operation section is operated in one direction from a start position, an external force which increases with an increase in the operation amount is applied in a direction opposite to the operation direction of the operation section until the operation amount of the operation section reaches a predetermined operation amount, when the operation amount of the operation section reaches the predetermined operation amount, an external force corresponding to the predetermined operation amount is applied in a direction opposite to the operation direction of the operation section, when the operation section is stopped, the external force applied to the operation section is reduced with an increase in a returning amount of the operation section from a stopping position of the operation section, when the returning amount of the operation section reaches a predetermined returning amount equal to the predetermined operation amount, the application of the external force to the operation section is stopped, and when the operation direction of the operation section is changed during the operation of the operation section, a direction and amount of application of an external force is repeatedly computed to be applied to the operation section when a predetermined operation amount is reached, wherein the computed external force comprises a resultant having a first component applied in a direction opposite to the operation direction of the operation section prior to changing the operation direction and a second component applied in a direction opposite to the operation direction of the operation section after changing the operation direction. The first component is gradually reduced and the second component is gradually increased with an increase in the operation amount of the operation section after changing the operation direction.

Accordingly, when the operation section is operated in one direction from the start position, an external force which increases with an increase in the operation amount of the operation section is applied in the direction opposite to the operation direction of the operation section until the operation amount reaches a predetermined operation amount. In addition, when the operation amount of the operation section reaches the predetermined operation amount, a maximum external force is reached is applied in the direction opposite to the operation direction. In such a case, the aforementioned Conditions (1) and (2) can be satisfied, so that a force which is similar to frictional force is applied to the operation section.

When the operation section is stopped, the external force applied to the operation section is reduced with an increase in the returning amount from the stopping position of the operation section. In addition, when the returning amount of the operation section reaches the predetermined returning amount equal to the predetermined operation amount, the application of the external force to the operation section is stopped. In such a case, oscillation of the operation section is prevented from occurring, so that the operation section can be stably held at the position where it is situated after the operation. Therefore, it is possible for an operator to experience an operational feel like that experienced when frictional force acts upon the operation section.

When the operation direction of the operation section is changed during the operation thereof, a resultant of the external force component applied in a direction opposite to the operation direction of the operation section prior to changing the operation direction, and the external force component applied in a direction opposite to the operation direction of the operation section after changing the operation direction is set equal to the external force applied to the operation section when the operation amount reaches the predetermined operation amount. In this case, the external force can be maintained at a constant value before and after changing the operation direction. Therefore, it is possible for the operator to experience an operational feel like that experienced when frictional force acts upon the operation section.

After changing the operation direction, with an increase in the amount of operation of the operation section, the external force component applied in the direction opposite to the operation direction of the operation section prior to changing the operation direction is gradually reduced, and the external force component applied in the direction opposite to the operation direction of the operation section after changing the operation direction is gradually increased. In such a case, it is possible to smoothly change the direction of application of the external force from the direction opposite to the operation direction of the operation section prior to changing the operation direction to the direction opposite to the operation direction of the operation section after changing the operation direction. Therefore, it is possible for the operator to experience an operational feel like that experienced when frictional force acts upon the operation section.

The force-applying input device having the above-described structure may be such that, when the operation section is operated in one direction from the start position, the increase in the external force until the operation amount of the operation section reaches the predetermined operation amount from the start position and the reduction in the external force until the returning amount of the operation section reaches the predetermined returning amount from the stopping position are computed in accordance with linear functions having slopes greater than 0.

Accordingly, when the increase in the external force until the operation amount of the operation section reaches the predetermined operation amount from the start position, and the reduction in the external force until the returning amount of the operation section reaches the predetermined returning amount from the stopping position are computed in accordance with linear functions having slopes greater than 0, a predetermined external force can be applied to the operation section at substantially the time in which the operation of the operation section is started. Therefore, it is possible for the operator to experience an operational feel like that experienced when frictional force acts upon the operation section.

The force-applying input device having the above-described structure may be such that, when the operation direction of the operation section is changed during the operation of the operation section, the direction of application of the external force is computed in accordance with an exponential function having an exponent greater than 1.

Accordingly, in the case in which the operation direction of the operation section is changed, when the direction of application of the external force is computed in accordance with an exponential function having an exponent greater than 1, it is possible to smoothly change the direction of application of the external force to the operation section from the direction opposite to the operation direction of the operation section prior to changing the operation direction to the direction opposite to the operation direction of the operation section after changing the operation direction. Therefore, the operator less frequently experiences an unpleasant feeling when operating the operation section, that is, the operator can experience an operational feel like that experienced when frictional force acts upon the operation section.

DESCRIPTION OF THE PREFERRED EMBODIMENT

Hereunder, a description of a force-applying input device of an embodiment of the present invention will be given with reference to FIGS. 1 to 6.

Figure 1:
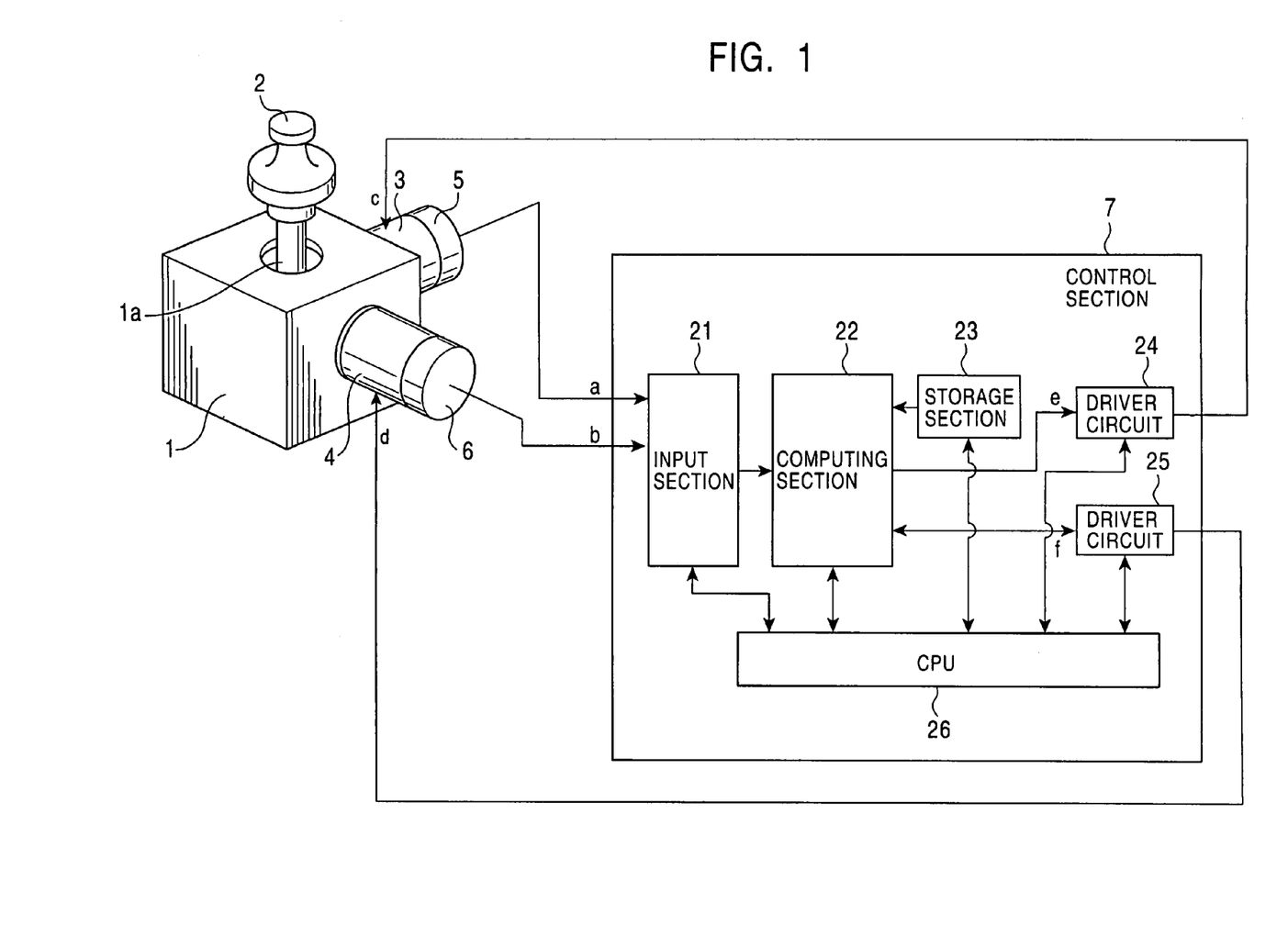
FIG. 1 is a structural view of a force-applying input device of an embodiment of the present invention.

As shown in FIG. 1, the force-applying input device of the embodiment primarily comprises a mechanical section 1, an operation section 2, first and second actuators 3 and 4, first and second position sensors 5 and 6, and a control section 7. The mechanical section 1 comprises a tilting lever 1a. The operation section 2 is mounted to an end of the tilting lever 1a. The first and second actuators 3 and 4 apply a force to the operation section 2 through the tilting lever 1a. The first and second position sensors 5 and 6 detect the amount and direction of operation of the tilting lever 1a. The control section 7 generates drive signals e and f of the respective first and second actuators 3 and 4 by receiving first and second position signals a and b output from the respective first and second position sensors 5 and 6.

Figure 2:
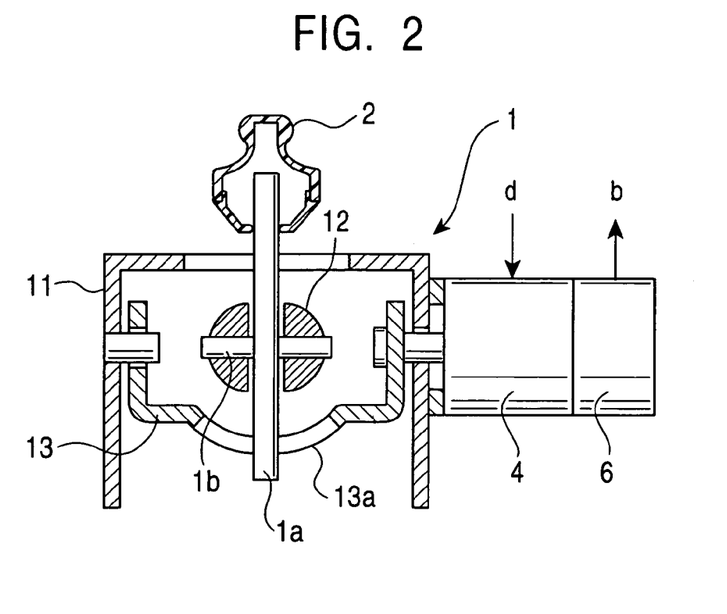
FIG. 2 is a sectional view of a mechanical section of the force-applying input device of the embodiment of the present invention, as seen from one direction.
Figure 3:
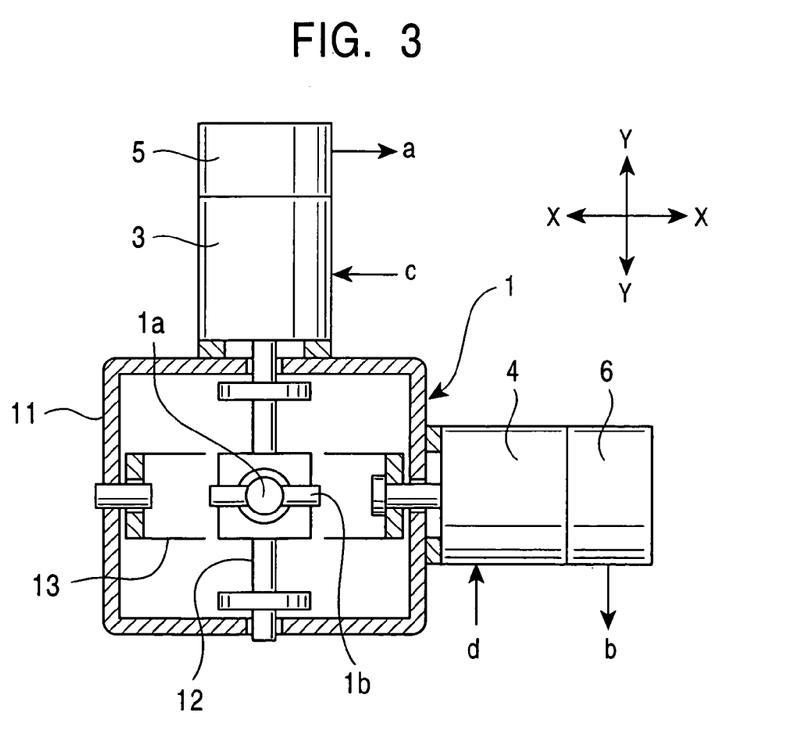
FIG. 3 is a sectional view of the mechanical section of the force-applying input device of the embodiment of the present invention, as seen from a direction perpendicular to the aforementioned one direction.

As shown in FIGS. 2 and 3, the mechanical section 1 comprises the tilting lever 1a, a case 11, a lever holding shaft 12 (X shaft) rotatably held at the case 11, and a swing arm 13 (Y shaft). The lever holding shaft 12 and the swing arm 13 are disposed perpendicular to each other. The tilting lever 1a is mounted to the lever holding shaft 12 so as to be rotatable only in directions of rotation of the swing arm 13. In FIGS. 2 and 3, reference numeral 1b denotes a central shaft for tilting the tilting lever 1a. The swing arm 13 has a long groove 13a through which the lower end portion of the tilting lever 1a passes. The width of the long groove 13a is slightly larger than the diameter of the lower end portion of the tilting lever 1a. When the tilting lever 1a is tilted in a tilting direction (along line X-X) as the lever holding shaft 12 rotates, the lower end portion of the tilting lever 1a can freely slide in the long groove 13a. In contrast, when the tilting lever 1a tilts in a tilting direction (along line Y-Y) as the central shaft 1b rotates, the swing arm 13 tilts together with the tilting lever 1a.

By virtue of such a structure, the tilting lever 1a can be arbitrarily tilted in a direction with the lever holding shaft 12 and the central shaft 1b serving as centers. The lever holding shaft 12 is rotated in the tilting direction of the tilting lever 1a by an amount that is proportional to the tilting amount of the tilting lever 1a in a direction along the line X-X. The swing arm 13 is rotated in the tilting direction of the tilting lever 1a by an amount that is proportional to the tilting amount of the tilting lever 1a in a direction along the line Y-Y.

The operation section 2 is formed with a shape and a size that allow an operator to operate the operation section 2.

The first actuator 3 is connected to the lever holding shaft 12, and the second actuator 4 is connected to the swing arm 13. The first actuator 3 and the second actuator 4 may be electric devices, such as motors or solenoids, or other direct operated devices. When direct operated devices are used as the actuators 3 and 4, a predetermined power transmission device is disposed between the actuator 3 and the lever holding shaft 12, and/or between the actuator 4 and the swing arm 13, for converting the rotational motion of the lever holding shaft 12 and/or the swing arm 13 into linear motion and transmitting the linear motion.

The first and second position sensors 5 and 6 detect the amount and direction of rotation of the rotary shafts of the first and second actuators 3 and 4, convert the detection results into electrical signals corresponding to the detection results, and output the electrical signals. The first and second position sensors 5 and 6 may be, for example, rotary encoders or rotary variable resistors. The rotary shaft of the first position sensor 5 is connected to the lever holding shaft 12, and the rotary shaft of the second position sensor 6 is connected to the swing arm 13.

As shown in FIG. 1, the control section 7 comprises an input section 21, a computing section 22, a storage section 23, driver circuits 24 and 25, and a central processing unit (CPU) 26. The input section 21 is used for inputting the first position signal output a from the first position sensor 5 and the second position signal b output from the second position sensor 6. The computing section 22 computes drive signals e and f of the first and second actuators 3 and 4 for applying a predetermined force to the operation section 2, based on the first and second position signals a and b. The storage section 23 stores, for example, predetermined operation amounts, and functions and coefficients serve as a basis for the computation. The driver circuits 24 and 25 drive the first and second actuators 3 and 4 by outputting drive powers c and d in accordance with the drive signals e and f output from the computing section 22. The CPU 26 controls each of the parts 21 to 25. The functions which are stored in the storage section 23 include linear functions, in which the first and second position signals a and b are used as variables, and have slopes greater than 0, and exponential functions, in which the first and second position signals a and b are used as variables, and have exponents greater than 1.

Based on the first and second position signals a and b input to the input section 21 and predetermined operation amounts, coefficients, and functions stored in the storage section 23, the computing section 22 carries out the following operations for determining force to be applied to the operation section 2:

(1) computing the amount and direction of operation of the operation section 2 by the amounts of changes in the position signals a and b, (2) when the operation section 2 is operated in one direction from a start position, based on a positive linear function stored in the storage section 23, repeatedly computing the drive signals e and f of the actuators 3 and 4 required to generate an external force applied in a direction opposite to the operation direction of the operation section, until the operation amount of the operating section 2 reaches a predetermined operation amount stored in the storage section 23, (3) when the amount of operation of the operation section 2 reaches the predetermined operation amount stored in the storage section 23, regardless of whether or not the amount of operation of the operation section 2 is increased, defining the drive signals e and f of the actuators 3 and 4 as drive signals e and f corresponding to those when the amount of operation of the operation section 2 reaches the predetermined operation amount stored in the storage section 23, (4) when the operation section 2 is stopped, computing a returning amount and a returning direction (point A direction) of the operation section 2 based on amounts of changes in the position signals a and b; and, until the returning amount of the operation section 2 reaches a predetermined returning amount equivalent to the predetermined operation amount stored in the storage section 23, repeatedly computing the drive signals e and f of the actuators 3 and 4 required to generate the external force in a direction opposite to the returning direction of the operation section 2, based on a negative linear function stored in the storage section 23, and (5) when the returning amount of the operation section 2 reaches the predetermined returning amount, stopping the application of the external force to the operation section 2.

Figure 4A:
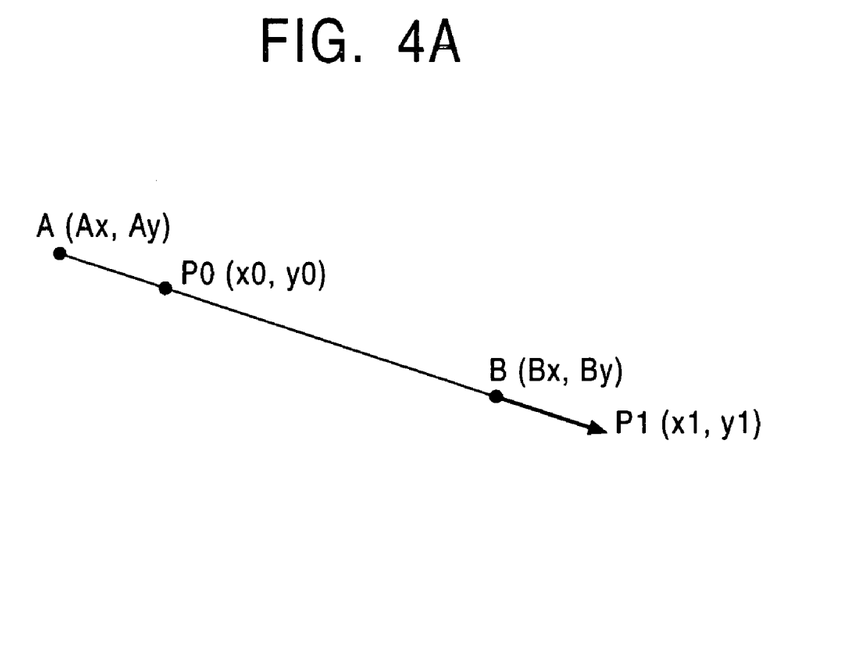
FIGS. 4A and 4B illustrate changes in a path of movement of an operation section and changes in external force acting upon the operation section when the operation section is operated in one direction from a start position.
Figure 4B:
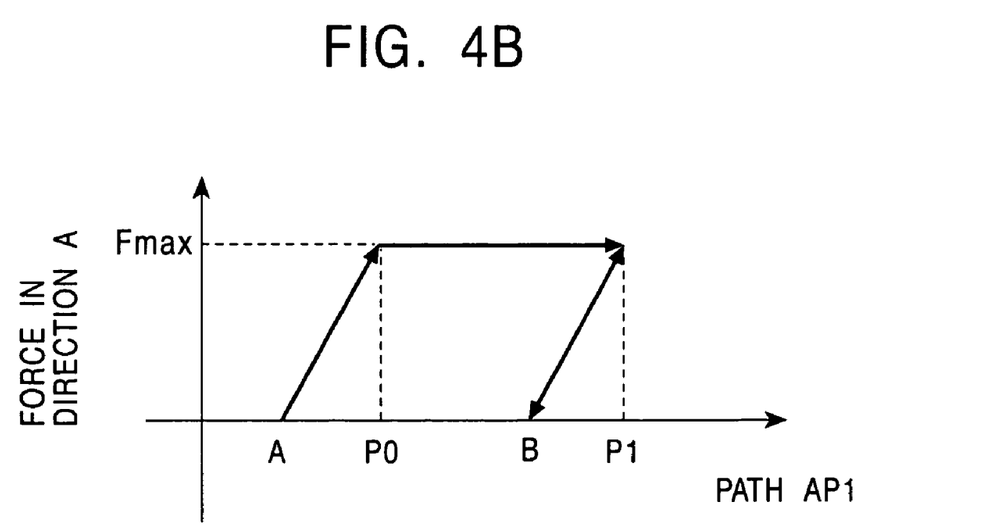

As shown in FIG. 4A, the operator operates the operation section 2 in a straight line to point P1 from a start position A through points P0 and B, and then stops operating the operation section 2 at P1 and takes his/her fingers off the operation section 2. FIG. 4B shows the operations of FIG. 4A being carried out by the operator. From the start position A to point P0 where the operation amount is equal to the predetermined operation amount stored in the storage section 23, external force applied in the point A direction by driving the actuators 3 and 4 gradually increases from 0 in accordance with the amount of operation of the operation section 2, and becomes equal to a maximum value Fmax at point P0. Thereafter, the external force equal in value to the maximum value Fmax is applied until the operation section 2 reaches a stopping point P1. When the operation section 2 reaches the stopping point P1 and the operator takes his/her fingers off the operation section 2, and during a time in which the operation section 2 returns from the stopping point P1 to point B, the external force applied in the point A direction by driving the actuators 3 and 4 is gradually reduced from the maximum value Fmax in accordance with the returning amount of the operation section 2, and becomes 0 at point B. At point B, the returning amount is equal to the predetermined returning amount stored in the storage section 23. By this, a certain resistance is applied to the operation of the operation section 2 during the operation of the operation section 2, and the operation section 2 can be reliably stopped when the operation of the operation section 2 is completed. Therefore, a force can be applied as if frictional force of a mechanism is applied to the operation section 2, and the operation section 2 can provide a proper operational feel.

Figure 6:
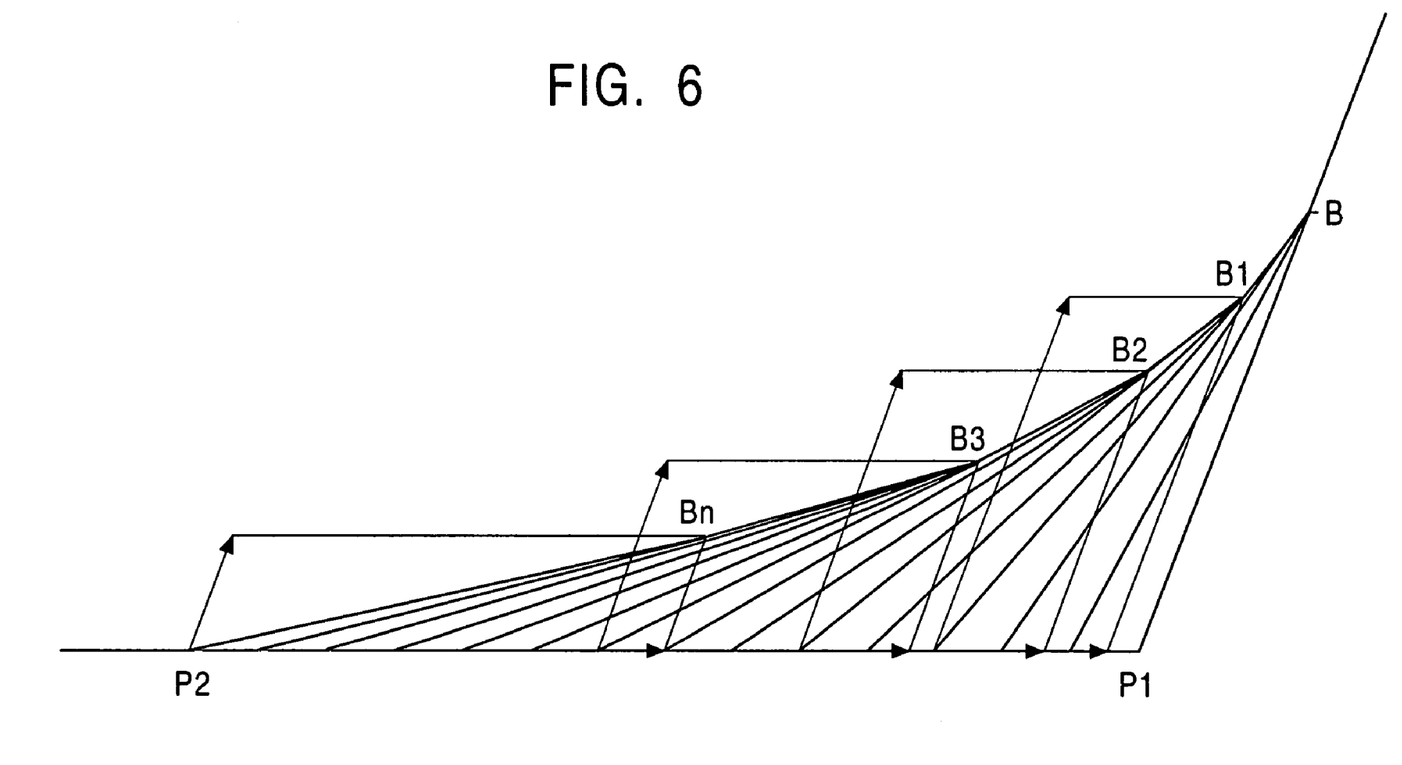
FIG. 6 is a graph showing changes in magnitude and direction of the external force when the operation direction of the operation section is changed during the operation of the operation section.

(6) When the operation direction of the operation section 2 is changed during the operation thereof, the drive signals e and f of the respective actuators 3 and 4 required for generating the external force are repeatedly computed based on an exponential function stored in the storage section, in which a resultant of a component applied in the direction opposite to the operation direction of the operation section 2 prior to changing the operation direction and a component applied in a direction opposite to the operation direction of the operation section 2 after changing the operation direction becomes equal to the maximum value Fmax. After changing the operation direction, with an increase in the amount of operation of the operation section 2, the component applied in the direction opposite to the operation direction of the operation section 2 prior to changing the operation direction is gradually reduced and the component applied in the direction opposite to the operation direction of the operation section 2 after changing the operation direction is gradually increased. By this computation, as shown in FIG. 6, returning positions Bn (B1, B2, B3, . . . ) of the operation section 2 after changing the operation direction are uniquely determined.

(7) When the operation section 2 is stopped, by the amounts of changes in the position signals a and b, a returning amount and a returning direction (point Bn direction) of the operation section 2 are computed. The drive signals e and f required for generating the external force in a direction opposite to the returning direction of the operation section 2 are repeatedly computed based on a negative linear function stored in the storage section 23 until the returning amount of the operation section 2 reaches a predetermined returning amount equivalent to the predetermined operation amount stored in the storage section 23.

(8) When the returning amount of the operation section 2 reaches the predetermined returning amount, the application of the external force to the operation section 2 is stopped.

Figure 5A:
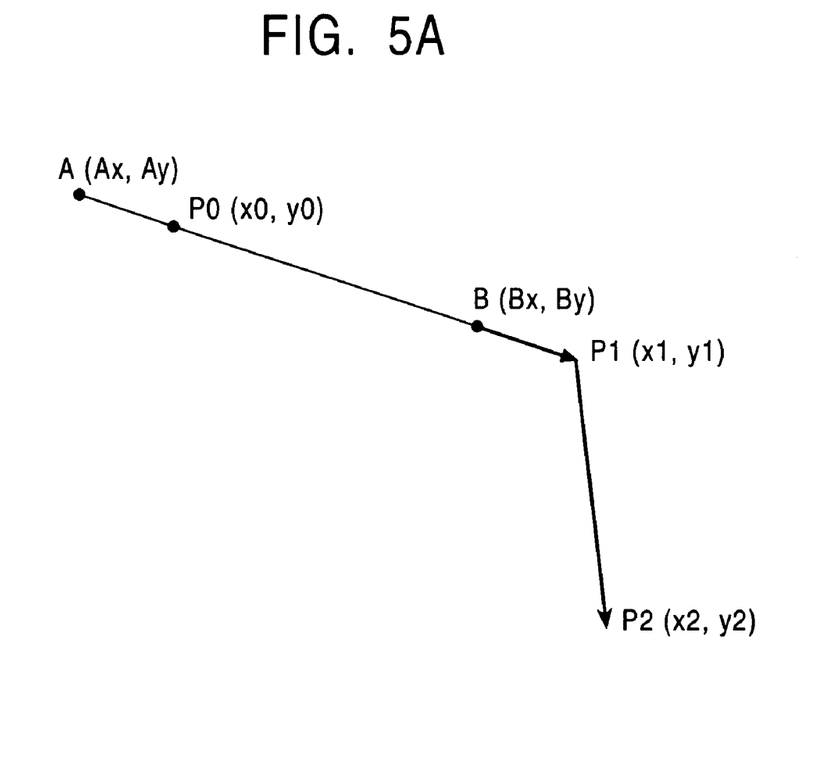
FIGS. 5A and 5B illustrate changes in the path of movement of the operation section and changes in the external force acting upon the operation section when the operation direction of the operation section is changed during the operation of the operation section.
Figure 5B:
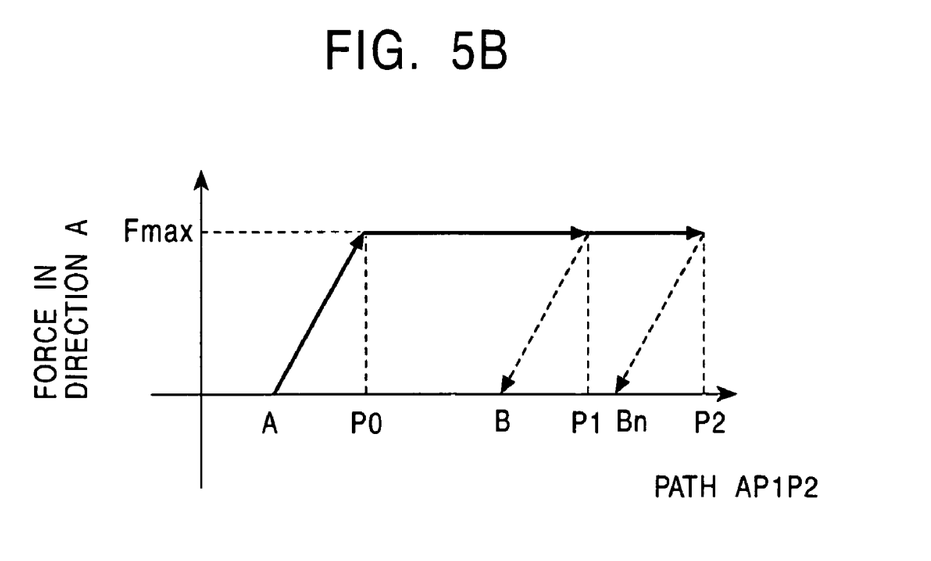

Therefore, as shown in FIG. 5A, when the operator operates the operation section 2 in a straight line from the start position A to point P1 through point P0 and point B, changes the operation direction of the operation section 2 and operates it to P2, and then takes his/her fingers off the operation section 2, the following operations are performed as shown in FIG. 5B. During the time in which the operation section 2 is operated from the start position A to point P0 where the operation amount is equal to the predetermined operation amount stored in the storage section 23, the external force applied in the point A direction by driving the actuators 3 and 4 is gradually increased from 0 in accordance with the amount of operation of the operation section 2, and becomes equal to the maximum value Fmax at point P0.

Thereafter, until the operation section 2 reaches the stopping point P2, the external force equal to the maximum value Fmax is applied in the point A direction. However, after changing the operation direction of the operation section 2, as shown in FIG. 6, the direction of application of the external force (maximum value Fmax) changes successively in accordance with the amount of operation of the operation section 2. Additionally, the component of force in the direction opposite to the operation direction of the operation section 2 after changing the application direction increases gradually based on an exponential function stored in the storage section 23. Likewise, the component force in the direction opposite to the operation direction of the operation section 2 prior to changing the application direction is gradually reduced based on an exponential function stored in the storage section 23. By this, a constant external force is always applied to the operation section 2, and the application direction is smoothly changed from the direction opposite to the operation direction of the operation section 2 prior to changing the application direction to the direction opposite to the operation direction of the operation section 2 after changing the application direction. Therefore, a force like frictional force of a mechanism acting upon the operation section 2 can be applied, and the operation section 2 can provide a proper operational feel. When the operation section 2 reaches the stopping point P2 and the operator takes off his/her fingers from the operation section 2 and during a time in which the operation section 2 returns from the stopping point P2 to point Bn where the returning amount is equal to the predetermined returning amount stored in the storage section 23, the external force applied in the point A direction is gradually reduced from the maximum value Fmax in accordance with the returning amount of the operation section 2, and becomes 0 at point B.

In force-applying input device, when the operation section 2 is operated in one direction from the start position A, an external force which increases with an increase in the operation amount of the operation section 2 is applied in the direction opposite to the operation direction of the operation section 2 until the operation amount reaches a predetermined operation amount. In addition, when the operation amount of the operation section 2 reaches the predetermined operation amount, the external force (maximum value Fmax) corresponding to that predetermined operation amount is applied in the direction opposite to the operation direction of the operation section 2. Therefore, it is possible to apply a force which is similar to frictional force to the operation section 2.

When the operation section 2 is stopped, the external force applied to the operation section 2 is reduced with an increase in the returning amount from a stopping position of the operation section 2. In addition, when the returning amount of the operation section 2 reaches the predetermined returning amount corresponding to the predetermined operation amount, the application of the external force to the operation section 2 is stopped. In such a case, oscillation of the operation section 2 is prevented from occurring, so that the operation section 2 can be stably held at the position where it is situated after the operation. Therefore, it is possible for an operator to experience an operational feel like that experienced when frictional force acts upon the operation section 2.

When the operation direction of the operation section 2 is changed during the operation of the operation section 2, the resultant of the external force component applied in the direction opposite to the operation direction of the operation section 2 prior to changing the operation direction and the external force component applied in the direction opposite to the operation direction of the operation section 2 after changing the operation direction is set equal to the maximum value Fmax. Therefore, the external force can be maintained at a constant value before and after changing the operation direction. Consequently, it is possible for the operator to experience an operational feel like that experienced when frictional force acts upon the operation section 2.

After changing the operation direction, with an increase in the amount of operation of the operation section 2, the external force component applied in the direction opposite to the operation direction of the operation section 2 prior to changing the operation direction is gradually reduced and the external force component applied in the direction opposite to the operation direction of the operation section 2 after changing the operation direction is gradually increased. Therefore, it is possible to smoothly change the direction of application of the external force from the direction opposite to the operation direction of the operation section 2 prior to changing the operation direction to the direction opposite to the operation direction of the operation section 2 after changing the operation direction. Therefore, it is possible for the operator to experience an operational feel like that experienced when frictional force acts upon the operation section 2.

In a force-applying input device, a predetermined external force can be applied to the operation section 2 at substantially the time in which the operation of the operation section 2 is started by computing, with the use of linear functions having slopes greater than 0, the increase in the external force until the operation amount of the operation section 2 reaches the predetermined operation amount from the start position A and the reduction in the external force until the returning amount of the operation section reaches the predetermined returning amount from the stopping position. Therefore, it is possible for the operator to experience an operational feel like that experienced when frictional force acts upon the operation section 2.

In a force-applying input device where the operation direction of the operation section 2 is changed, and when the direction of application of the external force is computed in accordance with an exponential function having an exponent greater than 1, it is possible to smoothly change the direction of application of external force to the operation section 2 from the direction opposite to the operation direction of the operation section prior to changing the operation direction to the direction opposite to the operation direction of the operation section after changing the operation direction. Therefore, the operator less frequently experiences an unpleasant feeling when operating the operation section 2, that is, the operator can experience an operational feel like that experienced when frictional force acts upon the operation section 2.

Although one may compute, with the use of linear functions having slopes greater than 0. the increase in the external force applied until the amount of operation of the operation section 2 reaches the predetermined operation amount from the start position A, and the reduction in the external force applied until the returning amount of the operation section reaches the predetermined returning amount from the stopping position, and although the direction of application of the external force is computed in accordance with exponential functions having exponents greater than 1 when the operation direction of the operation section 2 is changed, the scope of the present invention is not limited thereto. Therefore, the amount and direction of external forces applied to the operation section 2 can be computed in accordance with other functions as apparent to those skilled in the art.

What is claimed is:

1. A force-applying input device comprising:
a joystick operation section;
a position sensor to detect an operation state of the operation section;
an actuator to apply an external force to the operation section; and
a control section to control drive of the actuator based on a position signal output from the position sensor, the control section to compute operation amounts and operation directions of the operation section based on the position signal, and control the drive of the actuator, wherein,
when the operation section is operated in one direction from a start position, an external force which increases with an increase in the operation amount is applied in a direction opposite to the operation direction of the operation section until the operation amount of the operation section reaches a predetermined operation amount,
when an operation amount of the operation section reaches the predetermined operation amount, an external force corresponding to the predetermined operation amount is applied in the direction opposite to the operation direction of the operation section,
when the operation section is stopped, the external force applied to the operation section is reduced with an increase in a returning amount of the operation section from a stopping position of the operation section,
when the returning amount of the operation section reaches a predetermined returning amount equal to the predetermined operation amount, the application of the external force to the operation section is stopped, and
when the operation direction of the operation section is changed during the operation of the operation section, a direction and amount of application of an external force is repeatedly computed to be applied to the operation section when a predetermined operation amount is reached, wherein the computed external force comprises a resultant having a first component applied in a direction opposite to the operation direction of the operation section prior to changing the operation direction and a second component applied in a direction opposite to the operation direction of the operation section after changing the operation direction, the first component being gradually reduced and the second component being gradually increased with an increase in the operation amount of the operation section after changing the operation direction.

2. A force-applying input device according to claim 1, wherein, when the operation section is operated in one direction from the start position, the following are computed in accordance with linear functions having slopes greater than 0: the increase in the external force until the operation amount of the operation section reaches the predetermined operation amount from the start position and the reduction in the external force until the returning amount of the operation section reaches the predetermined returning amount from the stopping position.

3. A force-applying input device according to claim 1, wherein, when the operation direction of the operation section is changed during the operation of the operation section, the direction of application of the external force is computed in accordance with an exponential function having an exponent greater than 1.

4. A force-applying input device comprising:
a joystick operation section connected to a first end of a tilting lever, the tilting lever operably connected to a holding shaft;
a swing arm positioned about a second end of the tilting lever to define directions of rotation of the tilting lever;
a first actuator operably connected to the holding shaft;
a second actuator operably connected to the swing arm, the first and second actuators to apply an external force to the operation section;
a position sensor to detect an operation state of the operation section; and
a control section to control application of the external force by the actuator based on a position signal output from the position sensor, the control section to compute operation amounts and directions of the operation section based on the position signal,
wherein when the operation direction of the operation section is changed during the operation of the operation section, a direction and amount of application of the external force is repeatedly computed, and comprises a resultant having a first component applied in a direction opposite to the operation direction of the operation section prior to changing the operation direction and a second component applied in a direction opposite to the operation direction of the operation section after changing the operation direction, the first component being gradually reduced and the second component being gradually increased with an increase in the operation amount of the operation section after changing the operation direction.

5. A force-applying input device according to claim 4, wherein when the operation section is operated in one direction from a start position, an external force which increases with an increase in the operation amount is applied in a direction opposite to the operation direction of the operation section until the operation amount of the operation section reaches a predetermined operation amount.

6. A force-applying input device according to claim 5, wherein the increase in the external force corresponding to the increase in the operation amount is computed by at least a linear function having a slope greater than 0.

7. A force-applying input device according to claim 5, wherein when an operation amount of the operation section reaches the predetermined operation amount, an external force corresponding to the predetermined operation amount is applied in the direction opposite to the operation direction of the operation section.

8. A force-applying input device according to claim 7, wherein when the operation section is stopped, the external force applied to the operation section is reduced with an increase in a returning amount of the operation section from a stopping position of the operation section.

9. A force-applying input device according to claim 8, wherein the reduction in the external force corresponding to the increase in the returning amount of the operation section is computed by at least a linear function having a slope greater than 0.

10. A force-applying input device according to claim 8, wherein when the returning amount of the operation section reaches a predetermined returning amount equal to the predetermined operation amount, the application of the external force to the operation section is stopped.

11. A force-applying input device according to claim 4, wherein the direction of application of the external force is computed in accordance with an exponential function having an exponent greater than 1.

* * * * *